United States Patent
Ikeda et al.

(10) Patent No.: US 12,351,922 B2
(45) Date of Patent: Jul. 8, 2025

(54) ROUGHENING TREATMENT METHOD FOR STAINLESS STEEL SURFACE, METHOD FOR MANUFACTURING ROUGHENED STAINLESS STEEL, AND AQUEOUS COMPOSITION USED IN SAID METHODS

(71) Applicant: MITSUBISHI GAS CHEMICAL COMPANY, INC., Tokyo (JP)

(72) Inventors: Kazuhiko Ikeda, Kanagawa (JP); Tomoko Fujii, Tokyo (JP); Hiroshi Matsunaga, Yokkaichi (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 169 days.

(21) Appl. No.: 18/266,624

(22) PCT Filed: Dec. 13, 2021

(86) PCT No.: PCT/JP2021/045737
§ 371 (c)(1),
(2) Date: Jun. 12, 2023

(87) PCT Pub. No.: WO2022/131187
PCT Pub. Date: Jun. 23, 2022

(65) Prior Publication Data
US 2024/0044014 A1    Feb. 8, 2024

(30) Foreign Application Priority Data
Dec. 15, 2020 (JP) .................... 2020-207186

(51) Int. Cl.
*C23F 1/28* (2006.01)
(52) U.S. Cl.
CPC ...................... *C23F 1/28* (2013.01)

(58) Field of Classification Search
CPC ...... C23F 1/28; C23F 1/00; C23F 1/18; C23F 11/122; H01M 4/669; H01M 4/661;
(Continued)

(56) References Cited

U.S. PATENT DOCUMENTS 5,773,087 A * 6/1998 Kashihara ............... B05D 7/14
                                                    205/208
2003/0008504 A1* 1/2003 Miyazaki .......... H01L 21/30608
                                                    438/689
(Continued)

FOREIGN PATENT DOCUMENTS

CN   104805440 A   7/2015
CN   111421747 A   7/2020
(Continued)

OTHER PUBLICATIONS

International Search Report issued Feb. 22, 2022 in PCT/JP2021/045737 (with English translation), 5 pages.
Extended European Search Report issued May 31, 2024 in corresponding European Patent Application No. 21906549.7, 10 pages.

*Primary Examiner* — Duy Vu N Deo
(74) *Attorney, Agent, or Firm* — Element IP, PLC (57) ABSTRACT

The problem of the present invention is to provide a roughening treatment method in which the surface of stainless steel is sufficiently roughened in an efficient manner with few steps, while maintaining good surface quality of the stainless steel after treatment. The above problem is solved by a roughening treatment method for stainless steel, which comprises a roughening treatment step that uses a first aqueous composition, and a post-treatment step that uses a second aqueous composition. Namely, the roughening treatment step is to roughen the surface of stainless steel containing copper or a metal having an ionization tendency larger than copper by bringing the first aqueous composition into contact with the surface, wherein the first aqueous composition comprises 0.1% to 20% by mass of hydrogen (Continued)

peroxide based on the total amount of the first aqueous composition, 0.25% to 40% by mass of copper ions based on the total amount of the first aqueous composition, and 1% to 30% by mass of halide ions based on the total amount of the first aqueous composition, wherein the post-treatment step is to perform a post-treatment by bringing the second aqueous composition into contact, under acidic conditions, with the surface of the stainless steel that has been treated in the roughening treatment step, and wherein the second aqueous composition comprises at least a peroxide.

18 Claims, 3 Drawing Sheets

(58) Field of Classification Search
CPC ..... C23C 18/1689; C23C 18/54; C22C 38/00; C22C 38/60
USPC .......................................................... 216/108
See application file for complete search history.

(56) References Cited

U.S. PATENT DOCUMENTS

| 2010/0028602 | A1* | 2/2010 | Naritomi | B32B 27/32 |
| | | | | 264/238 |
| 2016/0372276 | A1* | 12/2016 | Han | C25D 5/12 |
| 2020/0194779 | A1 | 6/2020 | Kawaguchi | |
| 2022/0251714 | A1 | 8/2022 | Ikeda et al. | |
| 2022/0325419 | A1 | 10/2022 | Ikeda et al. | |

FOREIGN PATENT DOCUMENTS

| EP | 3124650 A1 | 2/2017 |
| JP | S58-193372 A | 11/1983 |
| JP | 2011038166 A | 2/2011 |
| JP | 2011168017 A | 9/2011 |
| JP | 2015183239 A | 10/2015 |
| WO | WO-2019039332 | 2/2019 |
| WO | WO-2020250784 A1 | 12/2020 |
| WO | WO-2021020253 A1 | 2/2021 |

* cited by examiner

ROUGHENING TREATMENT METHOD FOR STAINLESS STEEL SURFACE, METHOD FOR MANUFACTURING ROUGHENED STAINLESS STEEL, AND AQUEOUS COMPOSITION USED IN SAID METHODS

TECHNICAL FIELD

The present invention relates to a roughening treatment method for stainless steel surface, a method for manufacturing roughened stainless steel, which comprises the roughening treatment method, and an aqueous composition for use in the roughening treatment method for stainless steel surface, etc.

BACKGROUND ART

Because of its properties excellent in durability and weather resistance, stainless steel has recently been considered for application in various fields. For example, stainless steel is coming into widespread use in electronic components, battery current collector foils and automotive component housings. In more detail, when stainless steel is used in battery current collector foils or automotive component housings, the surface of stainless steel is roughened with the aim of adhering dielectric substances or organic materials. Alternatively, when stainless steel is used for heat radiation purposes, the surface of stainless steel is roughened with the aim of facilitating heat radiation.

When stainless steel is used for such purposes in each product, there is a need to increase the surface area of stainless steel. To this end, some methods have been known for treating the surface of stainless steel, e.g., with a treatment liquid containing iron chloride (e.g., Patent Literature 1). However, according to such a treatment method, many flat regions still remain on the surface of stainless steel after the treatment; and hence the surface of stainless steel is not always roughened sufficiently for the above purposes.

Moreover, as techniques to roughen the surface of stainless steel, those involving wet peening in combination with chemical roughening treatment have been found (e.g., Patent Literature 2). However, according to these techniques, the step of surface treatment in a particular manner is required prior to the roughening treatment. For this reason, there is room for improvement in terms of roughening treatment efficiency.

CITATION LIST

Patent Literature

Patent Literature 1: JP 2011-168017 A
Patent Literature 2: JP 2015-183239 A

SUMMARY OF INVENTION

Technical Problem

As described above, in the conventional roughening treatment of stainless steel surface, the roughening level is not always sufficient, and the treatment time and costs are also increased because complicated steps are required.

Moreover, the surface quality of stainless steel after roughening treatment may become a problem in some cases. For example, during the course of consideration, the inventors of the present invention have recognized that the stainless steel surface obtained upon roughening treatment does not have a uniform appearance, which may hinder its commercialization.

Namely, the problem of the present invention is to allow sufficient roughening treatment on the surface of stainless steel in an efficient manner with simple steps, and also to achieve a method for stably obtaining roughened stainless steel whose surface quality (e.g., appearance) is good.

Solution to Problem

As a result of repeating extensive and intensive efforts to achieve the problem stated above, the inventors of the present invention have found that when using an aqueous composition of particular composition, the surface of stainless steel can be sufficiently roughened in an efficient manner with few steps, and the surface quality (e.g., appearance) of the stainless steel surface can be maintained in a good state. This finding led to the completion of the present invention.

Namely, the present invention is as shown below.

[1] A roughening treatment method for roughening the surface of stainless steel, which comprises a roughening treatment step that uses a first aqueous composition, and a post-treatment step that uses a second aqueous composition, wherein the roughening treatment step is to roughen the surface of stainless steel containing copper or a metal having an ionization tendency larger than copper by bringing the first aqueous composition into contact with the surface, wherein the first aqueous composition comprises:
0.1% to 20% by mass of hydrogen peroxide based on the total amount of the first aqueous composition;
0.25% to 40% by mass of copper ions based on the total amount of the first aqueous composition; and
1% to 30% by mass of halide ions based on the total amount of the first aqueous composition, wherein the post-treatment step is to perform a post-treatment by bringing the second aqueous composition into contact, under acidic conditions, with the surface of the stainless steel that has been roughened in the roughening treatment step, and wherein the second aqueous composition comprises at least a peroxide.

[2] The roughening treatment method according to [1] above, wherein the post-treatment step comprises etching deposits on the surface of the stainless steel that has been roughened in the roughening treatment step.

[3] The roughening treatment method according to [2] above, wherein the deposits are derived from copper or a metal having an ionization tendency larger than copper contained in stainless steel to be subjected to the roughening treatment and the copper ions contained in the first aqueous composition.

[4] The roughening treatment method according to any one of [1] to [3] above, wherein the second aqueous composition comprises 0.2% to 20% by mass of a peroxide based on the total amount of the second aqueous composition.

[5] The roughening treatment method according to any one of [1] to [4] above, wherein the peroxide contained in the second aqueous composition comprises one or more selected from the group consisting of hydrogen peroxide, persulfuric acid and a salt thereof.

[6] The roughening treatment method according to any one of [1] to [5] above, wherein the second aqueous composition further comprises 0.5% to 15% by mass of an acid based on the total amount of the second aqueous composition.

[7] The roughening treatment method according to any one of [1] to [6] above, wherein the acid contained in the second aqueous composition comprises one or more selected from the group consisting of sulfuric acid and sodium hydrogen sulfate.

[8] The roughening treatment method according to any one of [1] to [7] above, wherein the second aqueous composition further comprises 0.1% to 5% by mass of an alcohol based on the total amount of the second aqueous composition.

[9] The roughening treatment method according to [8] above, wherein the alcohol is an alcohol containing 1 to 3 carbon atoms.

[10] The roughening treatment method according to any one of [1] to [9] above, wherein stainless steel to be subjected to the roughening treatment contains copper or at least aluminum as a metal having an ionization tendency larger than copper.

[11] The roughening treatment method according to any one of [1] to [10] above, wherein stainless steel to be subjected to the roughening treatment contains 5% by mass or more of copper or a metal having an ionization tendency larger than copper.

[12] The roughening treatment method according to any one of [1] to [11] above, wherein the first aqueous composition comprises at least one of copper sulfate or copper chloride as a compound supplying the copper ions.

[13] The roughening treatment method according to any one of [1] to [12] above, wherein the first aqueous composition comprises one or more selected from the group consisting of hydrochloric acid, sodium chloride and copper chloride as a compound supplying the halide ions.

[14] The roughening treatment method according to any one of [1] to [13] above, wherein the temperature required for the post-treatment is 20° C. to 60° C.

[15] The roughening treatment method according to any one of [1] to [14] above, wherein the time required for the post-treatment is 10 seconds to 120 seconds.

[16] The roughening treatment method according to any one of [1] to [15] above, wherein the maximum height (Sz) of the surface of stainless steel as defined in ISO 25178 is 10.0 µm or more both after the roughening treatment in the roughening treatment step and after the post-treatment in the post-treatment step.

[17] The roughening treatment method according to any one of [1] to [16] above, wherein the maximum height (Sz) of the surface of stainless steel as defined in ISO 25178 is 20.0 µm or less both after the roughening treatment in the roughening treatment step and after the post-treatment in the post-treatment step.

[18] The roughening treatment method according to any one of [1] to [17] above, wherein the maximum height (Sz) of the surface of stainless steel as defined in ISO 25178 is 5.0 µm or more greater than the maximum height (Sz) of the surface of untreated stainless steel both after the roughening treatment in the roughening treatment step and after the post-treatment in the post-treatment step.

[19] The roughening treatment method according to any one of [1] to [18] above, wherein the arithmetical mean height (Sa) of the surface of stainless steel as defined in ISO 25178 is 0.4 µm or more both after the roughening treatment in the roughening treatment step and after the post-treatment in the post-treatment step.

[20] The roughening treatment method according to any one of [1] to [19] above, wherein the arithmetical mean height (Sa) of the surface of stainless steel as defined in ISO 25178 is 1.0 µm or less both after the roughening treatment in the roughening treatment step and after the post-treatment in the post-treatment step.

[21] The roughening treatment method according to any one of [1] to [20] above, wherein the arithmetical mean height (Sa) of the surface of stainless steel as defined in ISO 25178 is 0.1 µm or more greater than the arithmetical mean height (Sa) of the flat surface of untreated stainless steel both after the roughening treatment in the roughening treatment step and after the post-treatment in the post-treatment step.

[22] The roughening treatment method according to any one of [1] to [21] above, wherein the stainless steel is a stainless steel foil.

[23] A method for manufacturing roughened stainless steel, which comprises the roughening treatment method according to any one of [1] to [22] above.

[24] A battery current collector foil, a solar battery substrate, a flexible substrate for electronic devices, a substrate for electric accumulator devices, a catalyst carrier, an electromagnetic wave shielding member, or a heat radiating member, which comprises the roughened stainless steel manufactured by the method for manufacturing roughened stainless steel according to [23] above.

[25] A second aqueous composition for use in post-treatment on the surface of stainless steel after roughening treatment with a first aqueous composition,
wherein the first aqueous composition comprises:
0.1% to 20% by mass of hydrogen peroxide based on the total amount of the first aqueous composition;
0.25% to 40% by mass of copper ions based on the total amount of the first aqueous composition; and
1% to 30% by mass of halide ions based on the total amount of the first aqueous composition, and
wherein the second aqueous composition comprises 0.2% to 20% by mass of a peroxide based on the total amount of the second aqueous composition.

[26] The aqueous composition according to [25] above, wherein the peroxide contained in the second aqueous composition comprises one or more selected from the group consisting of hydrogen peroxide, persulfuric acid and a salt thereof.

[27] The aqueous composition according to [25] or [26] above, wherein the second aqueous composition further comprises 0.5% to 15% by mass of an acid based on the total amount of the second aqueous composition.

[28] The aqueous composition according to [27] above, wherein the acid contained in the second aqueous composition comprises one or more selected from the group consisting of sulfuric acid and sodium sulfate.

[29] The aqueous composition according to any one of [25] to [28] above, wherein the second aqueous composition further comprises 0.1% to 5% by mass of an alcohol based on the total amount of the second aqueous composition.

[30] The aqueous composition according to [29] above, wherein the alcohol is an alcohol containing 1 to 3 carbon atoms.

Advantageous Effects of Invention

According to the present invention, the surface of stainless steel can be sufficiently roughened in an efficient manner with few steps, and roughened stainless steel whose surface quality (e.g., appearance) is good can be obtained stably.

DESCRIPTION OF EMBODIMENTS

The present invention will be further described in more detail below. The present invention is not limited to the following descriptions, and various modifications may be made without departing from the spirit of the present invention.

[1. Roughening Treatment Method for Stainless Steel]

In the roughening treatment method for roughening the surface of stainless steel (herein also referred to as the roughening treatment method for stainless steel) according to the present invention, a roughening treatment step and a post-treatment step are conducted. Namely, the roughening treatment method of the present invention comprises a roughening treatment step in which a first aqueous composition described in detail later is used to perform roughening treatment on the surface of stainless steel, and a post-treatment step in which a second aqueous composition described in detail later is used to perform a post-treatment on the surface of stainless steel after the roughening treatment. In the context of the present invention, performing roughening treatment or a post-treatment on the surface of stainless steel using an aqueous composition is intended to mean bringing an aqueous composition for use in each treatment into contact with the surface of stainless steel. As can be seen from this, the roughening treatment method for stainless steel of the present invention comprises at least the step of bringing a first aqueous composition and a second aqueous composition into contact with the surface of stainless steel.

<1-1. Roughening Treatment Step>

The roughening treatment step is to perform roughening treatment by bringing a first aqueous composition described in detail later into contact with stainless steel to be subjected to roughening treatment.

In the roughening treatment step, the temperature required for roughening treatment is preferably 20° C. to 60° C., more preferably 25° C. to 55° C., and particularly preferably 30 C to 50° C. Thus, the roughening treatment method for stainless steel of the present invention is advantageous in that the surface roughening of stainless steel proceeds even at not so high temperature, for example, even at room temperature of 25° C. In the context of the present invention, the temperature required for roughening treatment is intended to mean the temperature at which the first aqueous composition is brought into contact with the surface of stainless steel, particularly the solution temperature of the first aqueous composition to be brought into contact with the surface of stainless steel.

Moreover, in the roughening treatment step, the time required for roughening treatment is preferably 30 seconds to 120 seconds, more preferably 40 seconds to 100 seconds, and particularly preferably 50 seconds to 90 seconds. Thus, the roughening treatment method for stainless steel of the present invention is advantageous in that the roughening of stainless steel proceeds even within not so long time. In the context of the present invention, the time required for roughening treatment is intended to mean the time during which the first aqueous composition is in contact with the surface of stainless steel. For example, it means the time during which stainless steel is soaked in the first aqueous composition, or the time required from spraying the first aqueous composition over the surface of stainless steel until removing the first aqueous composition by water washing, etc.

Any method may be used to bring the first aqueous composition into contact with the surface of stainless steel. For example, it is possible to select a method in which the first aqueous composition is brought into contact with stainless steel in a dropwise manner or in a spraying (spray treatment) manner, etc., or a method in which stainless steel is soaked in the first aqueous composition. In the present invention, either of these methods may be selected for this purpose. For example, the first aqueous composition may be sprayed over stainless steel processed into a specific shape to obtain roughened stainless steel, or alternatively, an apparatus for adding dropwise, spraying or soaking the first aqueous composition is provided between stainless steel foil rolls, and a stainless steel foil is passed near the above apparatus to supply the aqueous composition during being conveyed in a roll-to-roll fashion from the roll around which the untreated stainless steel foil has been wound, and the roughened stainless steel foil is then wound around the other roll.

<1-2. Post-Treatment Step>

The post-treatment step is primarily conducted to maintain good surface quality of the stainless steel roughened in the above roughening treatment step. In particular, if stainless steel to be subjected to the roughening treatment contains relatively high amounts of base metals, the maintenance of surface quality is important because deposits which are deemed to arise from substitution reaction between these base metals and copper ions contained in the first aqueous composition described in detail later may be generated on the surface of stainless steel. For example, depending on the composition of stainless steel, visually detectable deposits will be observed after the roughening treatment, and such deposits may hinder product appearance and product performance.

The above base metals include copper or metals having an ionization tendency larger than copper, as described in detail later. Namely, deposits are preferably those derived from copper or a metal having an ionization tendency larger than copper contained in stainless steel to be subjected to the roughening treatment and copper ions contained in the first aqueous composition. Such deposits are compounds mainly containing copper, as exemplified by metal copper, oxides and hydroxides containing copper, etc.

According to the post-treatment step, the above deposits generated on the surface of stainless steel upon the roughening treatment can be efficiently removed by etching.

The post-treatment step is to further treat the stainless steel roughened in the roughening treatment step. In the post-treatment step, a post-treatment is performed in which a second aqueous composition described in detail later is brought into contact, under acidic conditions, with the surface of stainless steel after the roughening treatment.

The post-treatment is preferably performed at a temperature of 20° C. to 60° C., more preferably performed at a temperature of 25° C. to 55° C., and particularly preferably performed at a temperature of 30° C. to 50° C. Thus, the roughening treatment method for stainless steel of the present invention is advantageous in that the post-treatment is performed on the surface of stainless steel even at not so high temperature, for example, even at room temperature of 25° C. In the context of the present invention, the temperature required for the post-treatment is intended to mean the temperature at which the second aqueous composition is brought into contact with the surface of stainless steel, particularly the solution temperature of the second aqueous composition to be brought into contact with the surface of stainless steel, as in the case of the roughening treatment.

In the post-treatment step, the time required for the post-treatment is preferably 10 seconds to 120 seconds, more preferably 15 seconds to 100 seconds, and particularly preferably 20 seconds to 90 seconds. Thus, the roughening treatment method for stainless steel of the present invention is advantageous in that the post-treatment of stainless steel may be performed even within not so long time. In the context of the present invention, the time required for the post-treatment is intended to mean the time during which the second aqueous composition is in contact with the surface of stainless steel. For example, it means the time during which stainless steel is soaked in the second aqueous composition, or the time required from spraying the second aqueous composition over the surface of stainless steel until removing the second aqueous composition by water washing, etc.

In the post-treatment step, the second aqueous composition may be brought into contact with the surface of stainless steel in the same manner as used to bring the first aqueous composition into contact with the surface of stainless steel in the above roughening treatment step.

As described in detail later, it should be noted that the stainless steel roughened in the roughening treatment step may be subjected to water washing or other treatment. Likewise, the stainless steel treated in the post-treatment step may be subjected to water washing or other treatment.

<1-3. Surface Roughness of Stainless Steel after Each Treatment>

According to the roughening treatment method for stainless steel of the present invention, the maximum height (Sz) of the surface of stainless steel after the roughening treatment (herein also referred to as roughened stainless steel; a stainless steel foil (film or sheet) also falls within stainless steel) can be 5.0 μm or more, for example, 7.0 μm or more, 10.0 μm or more, or 12.0 μm or more.

Further, the post-treatment step allows the maintenance of primarily good appearance of the stainless steel surface, while the surface roughness can be maintained at almost the same level as that of the roughened stainless steel.

Namely, depending on the type of components contained in stainless steel to be subjected to the roughening treatment, deposits may be generated on the surface of stainless steel, and due to the presence of these deposits, the surface roughness immediately after the roughening treatment step will probably be different from the intended level, but the desired surface roughness can be achieved when these deposits are removed in the post-treatment step. Thus, the surface roughness obtained in the roughening treatment step can be maintained at the same level even after the post-treatment step.

Accordingly, in the roughening treatment method for stainless steel of the present invention, not only in stainless steel immediately after either the roughening treatment step or the post-treatment step, but also in the surface of roughened stainless steel finally obtained after completion of all the steps, the maximum height (Sz) of the surface can be 5.0 μm or more, for example, 7.0 μm or more, 10.0 μm or more, or 12.0 μm or more.

The same goes for the parameters (including Sa) of surface roughness (height) shown below in that the roughening level intended is achieved in the surface of stainless steel obtained immediately after the roughening treatment step or the post-treatment step or obtained as a final product.

In the roughening treatment method for stainless steel of the present invention, the maximum height (Sz) of the roughened stainless steel surface both after the roughening treatment step and after the post-treatment step can be preferably 5.0 μm or more, 7.0 μm or more, or 7.5 μm or more, and is more preferably 10.0 μm or more, even more preferably 11.0 μm or more, still more preferably 11.5 μm or more, still even more preferably 12.5 μm or more, further still even more preferably 13.0 μm or more, and particularly preferably 13.5 μm or more.

In addition, there is no particular limitation on the upper limit of the maximum height (Sz) of the stainless steel surface after the roughening treatment and the stainless steel surface after the post-treatment, but the upper limit is for example 20.0 μm or less, and may be 17.0 μm or less.

It should be noted that the maximum height (Sz) of the surface of stainless steel in a state not receiving the roughening treatment (also not receiving the post-treatment after the roughening treatment) (herein also referred to as untreated stainless steel) is not limited in any way, but it is for example 0.2 to 3.0 μm, etc., and is around 1.0 to 2.5 μm.

In the roughening treatment method for stainless steel of the present invention, the maximum height (Sz) of the roughened stainless steel surface both after the roughening treatment step and after the post-treatment step can be a value which is 2.0 μm or more greater than the maximum height (Sz) of the surface of untreated stainless steel, and is preferably a value which is 5.0 μm or more greater than that of untreated stainless steel. Moreover, the maximum height (Sz) of the roughened stainless steel surface both after the roughening treatment step and after the post-treatment step is more preferably a value which is 7.0 μm or more greater than that of untreated stainless steel, even more preferably a value which is 9.0 μm or more greater than that of untreated stainless steel, and may be a value which is 10.0 μm or more or 11.0 μm or more greater than that of untreated stainless steel.

In addition, only either after the roughening treatment step or after the post-treatment step, the increment of the maximum height (Sz) compared to the surface of untreated stainless steel may be within the range mentioned above.

In the roughening treatment method for stainless steel of the present invention, the arithmetical mean height (Sa) of the surface of roughened stainless steel can be 0.4 μm or more both after the roughening treatment step and after the post-treatment step. In the roughening treatment method for stainless steel of the present invention, the arithmetical mean height (Sa) of the surface of roughened stainless steel both after the roughening treatment step and after the post-treatment step can be preferably 0.45 μm or more, more preferably 0.50 μm or more, and even more preferably 0.55 μm or more, and may be 0.60 μm or more, 0.70 μm or more, 0.80 μm or more, or 1.0 μm or more.

In addition, there is no particular limitation on the upper limit of the arithmetical mean height (Sa) of the surface of roughened stainless steel, but the upper limit is for example 1.0 μm or less, and may be 0.9 μm or less.

It should be noted that the arithmetical mean height (Sa) of untreated stainless steel is not limited in any way, but it is for example 0.05 to 0.5 µm, or 0.1 to 0.3 µm.

In the roughening treatment method for stainless steel of the present invention, the arithmetical mean height (Sa) of the surface of roughened stainless steel both after the roughening treatment step and after the post-treatment step can be a value which is 0.1 µm or more greater than the arithmetical mean height (Sa) of the flat surface of untreated stainless steel, and is preferably a value which is 0.2 µm or more greater than that of untreated stainless steel, more preferably a value which is 0.3 µm or more greater than that of untreated stainless steel, and even more preferably a value which is 0.4 µm or more greater than that of untreated stainless steel, and may be a value which is 0.5 µm or more, 0.6 µm or more, or 0.7 µm or more greater than that of untreated stainless steel.

In addition, only either after the roughening treatment step or after the post-treatment step, the increment of the arithmetical mean height (Sa) compared to the surface of untreated stainless steel may be within the range mentioned above.

The above maximum height (Sz) and arithmetical mean height (Sa) are calculated according to ISO 25178. The apparatus used for measurement of these parameters is not limited in any way, and a laser microscope may be used for this purpose, by way of example.

It should be noted that the surface of roughened stainless steel on which deposits have been generated after the roughening treatment may be treated with a physical means (e.g., an adhesive tape) to remove the deposits, prior to the measurement of the maximum height (Sz) and arithmetical mean height (Sa) after the roughening treatment step. However, such a physical means is not always practical as a part of the manufacturing process.

The etching rate of stainless steel in the roughening treatment step is not limited in any way, but it is for example 0.5 µm/min or more, preferably 0.7 µm/min or more, more preferably 1.0 µm/min or more, even more preferably 1.2 µm/min or more, and particularly preferably 1.4 µm/min or more.

According to the roughening treatment method for stainless steel described above, stainless steel with a more uneven surface can be obtained simply by a substantially single-step treatment, i.e., roughening treatment alone in which the aqueous composition of the present invention is brought into contact with the surface of stainless steel to be treated, or optionally in combination with appropriate washing (e.g., water washing).

Further, even when the above deposits are generated on the surface of roughened stainless steel, the deposits can be removed by the post-treatment step to obtain roughened stainless steel whose surface quality (e.g., appearance) is good.

Moreover, as described above, the treatment conditions used in the roughening treatment and the post-treatment are mild, and the time required for these treatments is also short, so that the present invention enables the efficient roughening treatment of stainless steel.

[2. Stainless Steel]

Stainless steel to be subjected to the roughening treatment and the post-treatment with the aqueous composition of the present invention is exemplified by those containing copper or metals having an ionization tendency larger than copper. Specific examples of such stainless steels include those containing at least aluminum. In stainless steels containing secondary metal components such as aluminum, deposits are likely to be generated on the stainless steel surface upon the roughening treatment, but the deposits can be efficiently removed in the post-treatment step.

As stainless steels to be subjected to the roughening treatment method with the aqueous composition of the present invention, those contains 5% by mass or more of copper or metals having an ionization tendency larger than copper are suitable, those containing 7% by mass or more of copper or metals having an ionization tendency larger than copper are more suitable, and those containing 10% by mass or more of copper or metals having an ionization tendency larger than copper are particularly suitable. Moreover, in stainless steels to be subjected to the roughening treatment method, there is no particular limitation on the upper limit of the content of copper or metals having an ionization tendency larger than copper, but the upper limit is for example 20% by mass, or may be 30% by mass.

Copper or metals having an ionization tendency larger than copper may be exemplified by not only Al (aluminum) mentioned above, but also Zn (zinc), Cd (cadmium), Co (cobalt), Sn (tin), Pb (lead) and so on.

In addition, copper or metals having an ionization tendency larger than copper may include base metals, except for steel, according to the Harmonized System Codes (globally standardized six-digit codes for naming and classifying international trade commodities), i.e., copper, aluminum, lead, zinc, tin, tungsten, indium, molybdenum, germanium, tantalum, magnesium, cobalt, cadmium, titanium, zirconium, vanadium, gallium, antimony, manganese, beryllium, hafnium, niobium, bismuth, rhenium, thallium and so on.

As stainless steels to be subjected to the roughening treatment and the post-treatment with the aqueous composition of the present invention, stainless steels containing copper or aluminum as a metal having an ionization tendency larger than copper are preferred among those mentioned above. This is because in stainless steels containing aluminum, deposits are likely to be generated on the stainless steel surface upon the roughening treatment, but the deposits can be efficiently removed in the post-treatment step.

There is no particular limitation on the lower limit of the aluminum content in stainless steels containing copper or aluminum as a metal having an ionization tendency larger than copper, but the lower limit is preferably 3% by mass or more, more preferably 5% by mass or more, and even more preferably 7% by mass or more, and may be 10% by mass or more. There is no particular limitation on the upper limit of the aluminum content, but the upper limit is for example 20% by mass, or may be 30% by mass.

In addition, there is no particular limitation on the size, thickness and shape of stainless steels to be subjected to the roughening treatment and the post-treatment, and these treatments may be performed on stainless steel foils, by way of example. The thickness of stainless steel foils to be subjected to the roughening treatment and the post-treatment is not limited in any way, but it is for example 1 µm or more and 500 µm or less, and preferably 10 µm or more and 100 µm or less.

Moreover, as described above, the maximum height (Sz) in the roughened stainless steel surface after the roughening treatment and after the post-treatment is for example 5.0 µm or more or 7.0 µm or more, preferably 10.0 µm or more, more preferably 11.0 µm or more, even more preferably 11.5 µm or more, sill more preferably 12.0 µm or more or 12.5 µm or more, still even more preferably 13.0 m or more, and particularly preferably 13.5 µm or more.

Likewise, there is no particular limitation on the upper limit of the maximum height (Sz) of the roughened stainless steel surface after the roughening treatment and after the post-treatment, but the upper limit is for example 20.0 µm or less, and may be 17.0 µm or less.

The arithmetical mean height (Sa) of the surface of roughened stainless steel after the roughening treatment and after the post-treatment is for example 0.40 µm or more, preferably 0.45 µm or more, more preferably 0.50 µm or more, and even more preferably 0.55 µm or more, and may be 0.60 µm or more, 0.70 µm or more, 0.80 µm or more, or 1.0 µm or more.

Likewise, there is no particular limitation on the upper limit of the arithmetical mean height (Sa) of the surface of roughened stainless steel after the roughening treatment and after the post-treatment, but the upper limit is for example 1.0 µm or less, and may be 0.9 pim or less.

[3. Method for Manufacturing Stainless Steel]

The method for manufacturing roughened stainless steel of the present invention comprises at least the above roughening treatment method. According to the method for manufacturing roughened stainless steel of the present invention, it is possible to manufacture roughened stainless steel which has a rougher surface than before the roughening treatment step, i.e., a more uneven surface than the untreated surface, and which is excellent in surface quality.

Stainless steel to be subjected to the method for manufacturing roughened stainless steel of the present invention is as described in the above section [2. Stainless steel].

The maximum height (Sz) and arithmetical mean height (Sa) of the roughened stainless steel surface obtained by the method for manufacturing roughened stainless steel of the present invention are as described in the above section [2. Stainless steel].

Roughened stainless steel obtained by the method for manufacturing roughened stainless steel of the present invention can be used, for example, in battery current collector foils for solid-state batteries or lithium-ion batteries, etc., solar battery substrates, flexible substrates for electronic devices, substrates for electric accumulator devices, carriers for exhaust gas purification catalysts, etc., electromagnetic wave shielding members, heat radiating members, and other applications. Roughened stainless steel foils obtained by the method for manufacturing roughened stainless steel of the present invention are preferred for use as battery current collector foils, by way of for example.

[4. Aqueous Composition]

The aqueous composition used in the roughening treatment method for stainless steel of the present invention comprises a first aqueous composition for use in the roughening treatment step and a second aqueous composition for use in the post-treatment step. A target preferred for the roughening treatment and the post-treatment with the aqueous composition of the present invention is exemplified by stainless steels as described above.

<4-1. First Aqueous Composition (Composition for Use in the Roughening Treatment Step)>

The first aqueous composition is preferred for use in the roughening treatment of stainless steel surface, i.e., treatment to roughen the stainless steel surface to give a more uneven surface.

The first aqueous composition comprises 0.1% to 20% by mass of hydrogen peroxide, 0.25% to 40% by mass of copper ions, and 1% to 30% by mass of halide ions, based on the total amount (total mass) of the first aqueous composition. In addition to these components, the aqueous composition comprises water, especially ion exchanged water or ultrapure water.

Each component of the first aqueous composition will be explained below.

4-1-1. Hydrogen Peroxide

Hydrogen peroxide to be contained in the first aqueous composition is usually provided as an aqueous solution of appropriate concentration for admixture with other components. The concentration of hydrogen peroxide in an aqueous hydrogen peroxide solution for use in the preparation of the aqueous composition is not limited in any way, and it may be for example 10% to 90%, and is preferably 35% to 60% in line with the industrial standards.

Moreover, hydrogen peroxide may contain a stabilizer in an amount up to around 0.01% by mass, and acceptable stabilizers include sulfuric acid, phosphoric acid and so on. Hydrogen peroxide may be prepared in any manner and may be available through any route. For example, hydrogen peroxide prepared by the anthraquinone method may be used.

The concentration of hydrogen peroxide contained in the first aqueous composition is 0.1% to 20% by mass based on the total amount (total mass) of the first aqueous composition, but it is preferably 0.12% to 15% by mass, more preferably 0.15% to 10% by mass, and particularly preferably 0.18% to 8% by mass, based on the total amount (total mass) of the first aqueous composition. Moreover, the lower limit of the concentration of hydrogen peroxide contained in the first aqueous composition may be, for example, 0.001% by mass, 0.01% by mass, 0.05% by mass, 0.15% by mass, 0.1% by mass, 0.2% by mass, 0.3% by mass, 0.5% by mass, 1.0% by mass, 1.5% by mass, or 2.0% by mass, based on the total amount (total mass) of the first aqueous composition, while the upper limit of the concentration of hydrogen peroxide contained in the first aqueous composition may be, for example, 40% by mass, 35% by mass, 30% by mass, 25% by mass, 18% by mass, 15% by mass, 12% by mass, 10% by mass, 8% by mass, 7% by mass, 5% by mass, 3% by mass, 2% by mass, etc., based on the total amount (total mass) of the first aqueous composition. The concentration range of hydrogen peroxide may be selected as appropriate from the above lower and upper limits combined as appropriate, for example, 0.001% to 40% by mass, 0.01% to 30% by mass, 0.05% to 20% by mass, 0.1% to 5.0% by mass, 0.1% to 3.0% by mass, 0.1% to 2.0% by mass, 0.2% to 20% by mass, 0.2% to 5.0% by mass, 0.2% to 3.0% by mass, 0.2% to 2.0% by mass, etc. As a result of selecting the concentration of hydrogen peroxide from among these ranges, the effect of the present invention tends to be achieved in a more preferred manner.

4-1-2. Copper Ions

Copper ions contained in the first aqueous composition can be generated by mixing a copper compound serving as a copper ion source with other components. The copper ion source may be of any type, as long as it is a copper compound capable of supplying copper ions in the aqueous composition.

Examples of such a copper compound include copper sulfate (e.g., cupric sulfate), copper chloride (e.g., cupric chloride), copper tetrafluoroborate, cupric bromide, cupric oxide, copper phosphate, copper acetate, copper formate, copper nitrate and so on, which may be in anhydride form or in pentahydrate form. Among them, preferred is copper sulfate or copper chloride in terms of more effectively and reliably providing the effect of the present invention and in terms of easy handling and cost effectiveness, more preferred is cupric sulfate or cupric chloride, and even more preferred is cupric sulfate. These members may be used either alone or in combination.

It is inferred that copper ions contained in the first aqueous composition will cause substitution reaction for nickel and chromium, which are components of stainless steel, during the roughening treatment, and substitution reaction products derived from copper ions are then removed to obtain a roughened pattern.

The concentration of copper ions contained in the first aqueous composition is 0.25% to 40% by mass based on the total amount (total mass) of the first aqueous composition, but it is preferably 0.25% to 30% by mass or 1.0% to 30% by mass, more preferably 0.5% to 25% by mass or 3.0% to 25% by mass, and particularly preferably 1.5% to 20% by mass or 5.0% to 20% by mass, based on the total amount (total mass) of the first aqueous composition. Moreover, the lower limit of the concentration of copper ions contained in the first aqueous composition may be, for example, 0.01% by mass, 0.1% by mass, 0.2% by mass, 0.4% by mass, 0.6% by mass, 0.8% by mass, 1.0% by mass, 1.5% by mass, 2.0% by mass, or 2.5% by mass, based on the total amount (total mass) of the first aqueous composition. Among the above values, the lower limit may be 1.0% by mass, 1.5% by mass, etc. Likewise, the upper limit of the concentration of copper ions contained in the first aqueous composition may be, for example, 45% by mass, 40% by mass, 35% by mass, 30% by mass, 25% by mass, 20% by mass, 18% by mass, 15% by mass, 10% by mass, 9% by mass, 7% by mass, 5% by mass, 3% by mass, etc., based on the total amount of the first aqueous composition. The concentration range of copper ions may be selected as appropriate from the above lower and upper limits combined as appropriate, for example, 0.01% to 45% by mass, 0.1% to 40% by mass, 0.2% to 35% by mass, 0.4% to 25% by mass, 1.0% to 9% by mass, 1.0% to 10% by mass, 1.5% to 9% by mass, 1.5% to 10% by mass, etc. As a result of selecting the concentration of copper ions from among these ranges, the effect of the present invention tends to be achieved in a more preferred manner.

4-1-3. Halide Ions (Halogen Ions)

Halide ions to be contained in the first aqueous composition may be of any type, and examples include fluoride ions, chloride ions, bromide ions and iodide ions, with chloride ions being more preferred in terms of easy handling and cost effectiveness.

Halogen compounds supplying halide ions are not limited in any way, and examples include alkali metal halides (e.g., sodium halides and potassium halides), alkaline earth metal halides (e.g., calcium halides), ammonium halides, copper halides, and hydrogen halides. Among them, preferred are alkali metal halides or hydrogen halides in terms of more effectively and reliably providing the effect of the present invention, and more preferred is hydrochloric acid or sodium chloride.

Such halogen compounds are used either alone or in combination. It should be noted that halogen compounds may overlap with the above copper compounds. For example, when a copper halide is used as a source of halide ions, this copper halide also falls within the above copper compounds serving as a copper ion source. Copper chloride is preferred as a copper halide. Halogen compounds (halide ions) will cause pitting corrosion on the passive film during the roughening treatment of the stainless steel surface.

The concentration of halide ions contained in the first aqueous composition is 1% to 30% by mass based on the total amount (total mass) of the first aqueous composition, but it is preferably 2.0% to 25% by mass, more preferably 3.0% to 20% by mass, particularly preferably 5.0% to 15% by mass, and even more preferably 8% to 15% by mass, based on the total amount (total mass) of the first aqueous composition. Moreover, as to the concentration range of halide ions contained in the first aqueous composition, the lower limit may be set to any of 0.01% by mass, 0.1% by mass, 0.5% by mass, 1.0% by mass, 2.0% by mass, 3.0% by mass, 5.0% by mass and 8% by mass, based on the total amount (total mass) of the first aqueous composition, while the upper limit may be set to any of 40% by mass, 35% by mass, 30% by mass, 25% by mass, 20% by mass, 15% by mass, 12% by mass and 10% by mass, based on the total amount of the first aqueous composition. The concentration range of halide ions may be selected as appropriate from the above lower and upper limits combined as appropriate, for example, 0.01% to 40% by mass, 0.1% to 40% by mass, 0.05% to 35% by mass, 1.0% to 35% by mass, 1.5% to 30% by mass, 2.0% to 20% by mass, 3.0% to 15% by mass, 5.0% to 12% by mass, 8.0% to 10% by mass, etc. As a result of selecting the concentration of halide ions from among these ranges, the effect of the present invention tends to be achieved in a more preferred manner.

4-1-4. Water

The first aqueous composition of the present invention may comprise water, and preferably comprises water. The water intended here is not limited in any way, but it is preferably water which has been treated to remove metal ions, organic impurities, particles and so on by distillation, ion exchange treatment, filter treatment, various adsorption treatments, etc., and it is more preferably pure water, and particularly preferably ultrapure water.

The content of water in the first aqueous composition of the present invention is the balance of the composition (i.e., other than the individual components described above and additives described in detail later), and is not limited in any way, but it is preferably 10% to 98.6% by mass, more preferably 50% to 98% by mass, even more preferably 65% to 95% by mass, and particularly preferably 75% to 90% by mass, based on the total amount (total mass) of the first aqueous composition.

It should be noted that the first aqueous composition of the present invention is preferably in the form of a solution, and is preferably free from components which are non-soluble in the composition in the form of a solution, as exemplified by solid particles such as abrasive particles.

4-1-5. Function and Properties of the First Aqueous Composition

The first aqueous composition comprising the above individual components is deemed to function as follows during the roughening treatment of the stainless steel surface.

Halide ions are responsible for pitting corrosion of the oxide film which is usually formed on the surface of stainless steel. Copper ions have the effect of causing substitution reaction for nickel and chromium, which are components of stainless steel, as described above, and substitution reaction products derived from copper ions are then removed to form an uneven pattern with high Sz, i.e., a roughened pattern on the surface of stainless steel.

Likewise, hydrogen peroxide serves to remove the above substitution reaction products derived from copper ions after the substitution reaction.

The first aqueous composition may be prepared by stirring the hydrogen peroxide-containing component, the copper ion-supplying component, the halide ion-supplying component and water mentioned above, optionally together with other components, until a uniform mixture is obtained.

The properties of the first aqueous composition are not limited in any way, but its pH value is preferably −1.0 to 4.0, more preferably −0.5 to 3.0, even more preferably −0.25 to 2.5, and particularly preferably 0.0 to 2.0. The pH value may be measured, for example, by the method described in the Example section.

<4-2. Second Aqueous Composition (Aqueous Composition for Use in the Post-Treatment Step)>

The second aqueous composition is used in the post-treatment step mentioned above primarily for the purpose of removing deposits precipitated on the stainless steel surface upon the roughening treatment with the first aqueous composition.

With the second aqueous composition, deposits which are deemed to arise from substitution reaction between copper ions contained in the first aqueous composition and copper or the above metal(s) having an ionization tendency larger than copper in stainless steel are efficiently etched and removed from the stainless steel surface.

The second aqueous composition comprises a peroxide (serving as an oxidizing agent). The second aqueous composition preferably comprises 0.2% to 20% by mass of a peroxide (serving as an oxidizing agent) based on the total amount (total mass) of the second aqueous composition. The second aqueous composition preferably further comprises 0.5% to 15% by mass of an acid, and more preferably further comprises 0.1% to 5.0% by mass of an alcohol, based on the total amount (total mass) of the second aqueous composition. In addition to these components, the second aqueous composition comprises water, particularly preferably ion exchanged water or ultrapure water.

Each component of the second aqueous composition will be explained blow.

4-2-1. Peroxide (Serving as an Oxidizing Agent)

The peroxide to be contained in the second aqueous composition is not limited in any way, but it is preferably selected from the group consisting of hydrogen peroxide, persulfuric acid, and a persulfuric acid salt. These members may be used either alone or in admixture. As a persulfuric acid salt, for example, sodium persulfate, potassium persulfate, ammonium persulfate or the like may be used. Among them, preferred is hydrogen peroxide, persulfuric acid or sodium persulfate in terms of more effectively and reliably providing the effect of the present invention.

Moreover, a non-peroxide oxidizing agent may be used. Such a non-peroxide oxidizing agent may be used in place of the peroxide or in combination with the peroxide.

The concentration of the peroxide contained in the second aqueous composition is preferably 0.2% to 20% by mass based on the total amount (total mass) of the second aqueous composition, but it is more preferably 0.5% to 10% by mass, even more preferably 0.7% to 6% by mass, particularly preferably 1.0% to 4% by mass, and still even more preferably 1.5% to 3% by mass, based on the total amount (total mass) of the second aqueous composition. Moreover, the lower limit of the concentration of the peroxide contained in the second aqueous composition may be, for example, 0.01% by mass, 0.05% by mass, 0.1% by mass, 0.25% by mass, 0.3% by mass, 0.6% by mass, 1.0% by mass, 1.2% by mass, 1.8% by mass, 2.0% by mass, or 2.5% by mass, based on the total amount (total mass) of the second aqueous composition, while the upper limit of the concentration of the peroxide contained in the second aqueous composition may be, for example, 30% by mass, 25% by mass, 20% by mass, 15% by mass, 12% by mass, 10% by mass, 9% by mass, 7% by mass, 5% by mass, 4.5% by mass, 3.5% by mass, etc., based on the total amount (total mass) of the second aqueous composition. The concentration range of the peroxide may be selected as appropriate from the above lower and upper limits combined as appropriate, for example, 0.01% to 30% by mass, 0.05% to 25% by mass, 0.1% to 20% by mass, 0.1% to 15% by mass, 0.25% to 12% by mass, 0.3% to 9% by mass, 0.6% to 7% by mass, 1.2% to 5.0% by mass, 1.8% to 4.5% by mass, 2.0% to 3.5% by mass, etc. As a result of selecting the concentration of the peroxide from among these ranges, the effect of the present invention tends to be achieved in a more preferred manner. When two or more peroxides are used in combination, the sum of their amounts should fall within the above range.

When hydrogen peroxide is used as a peroxide in the second aqueous composition, the concentration range of hydrogen peroxide is preferably 0.3% to 18% by mass, more preferably 0.5% to 15% by mass, even more preferably 1.0% to 12% by mass, and particularly preferably 1.2% to 10% by mass, based on the total amount (total mass) of the second aqueous composition, and may be 1.5% to 8.0% by mass based on the total amount (total mass) of the second aqueous composition. It should be noted that the content of hydrogen peroxide in the second aqueous composition may be within the range mentioned in the previous paragraph.

Alternatively, when persulfuric acid or a persulfuric acid salt is used as a peroxide in the second aqueous composition, the total content of persulfuric acid and a persulfuric acid salt is preferably slightly greater than the content of hydrogen peroxide in the case of using hydrogen peroxide. For example, the total content of persulfuric acid and a persulfuric acid salt is preferably 5.0% to 20% by mass, more preferably 5.5% to 18% by mass, even more preferably 6.0% to 16% by mass, and particularly preferably 7.0% to 14% by mass, based on the total amount (total mass) of the second aqueous composition, and may be 8.0% to 12% by mass based on the total amount (total mass) of the second aqueous composition.

However, the total content of persulfuric acid and a persulfuric acid salt in the second aqueous composition may be within the range mentioned in the previous paragraph.

4-2-2. Acid

Since the post-treatment step is conducted under acidic conditions, the second aqueous composition preferably comprises an acid. As an acid to be contained in the second aqueous composition, a protonic acid (Bronsted acid), a protonic acid salt, a Lewis acid or the like may be used without particular limitation, but preferred for use is a protonic acid, such as sulfuric acid, hydrochloric acid, nitric acid, etc. Moreover, the acid intended here also includes an acid salt, and a salt such as sodium hydrogen sulfate, potassium hydrogen sulfate, calcium sulfate or the like may be used for this purpose. These members may be used either alone or in admixture.

Among them, preferred is sulfuric acid or sodium hydrogen sulfate in terms of more effectively and reliably providing the effect of the present invention, and more preferred is sulfuric acid.

The concentration of the acid contained in the second aqueous composition is preferably 0.5% to 15% by mass based on the total amount (total mass) of the second aqueous composition, but it is more preferably 2.0% to 10% by mass, even more preferably 3.0% to 8.0% by mass, and particularly preferably 3.5% to 6.0% by mass, based on the total amount (total mass) of the second aqueous composition, and may be 4.0% to 5.0% by mass based on the total amount (total mass) of the second aqueous composition. Moreover, the lower limit of the concentration of the acid contained in the second aqueous composition may be, for example, 0.05% by mass, 0.1% by mass, 0.2% by mass, 0.3% by mass, 0.7% by mass, 1.0% by mass, 1.5% by mass, 1.8% by mass, 2.5% by mass, or 3.5% by mass, based on the total amount (total mass) of the second aqueous composition, while the upper limit of the concentration of the acid contained in the second aqueous composition may be, for example, 40% by mass, 30% by mass, 25% by mass, 20% by mass, 18% by mass, 15% by mass, 12% by mass, 9.0% by mass, 7.0% by mass, 6.5% by mass, etc., based on the total amount (total mass) of the second aqueous composition. The concentration range of the acid may be selected as appropriate from the above lower and upper limits combined as appropriate, for example, 0.05% to 40% by mass, 0.1% to 30% by mass, 0.2% to 25% by mass, 0.3% to 20% by mass, 0.7% to 18% by mass, 1.0% to 15% by mass, 1.5% to 12% by mass, 1.8% to 9.0% by mass, 2.5% to 7.0% by mass, 3.5% to 6.5% by mass, etc. As a result of selecting the concentration of the acid from among these ranges, the effect of the present invention tends to be achieved in a more preferred manner.

4-2-3. Alcohol

The second aqueous composition preferably comprises an alcohol, particularly a water-soluble alcohol. Such an alcohol preferably contains 1 to 5 carbon atoms, more preferably contains 1 to 3 carbon atoms, as exemplified by methanol, ethanol, n-propanol, etc. As an alcohol, these members may be used either alone or in admixture.

The concentration of the alcohol contained in the second aqueous composition is preferably 0.1% to 5.0% by mass based on the total amount (total mass) of the second aqueous composition, but it is more preferably 0.2% to 4.0% by mass, even more preferably 0.3% to 3.5% by mass, and particularly preferably 0.5% to 2.5% by mass, based on the total amount (total mass) of the second aqueous composition, and may be 0.7% to 2.0% by mass based on the total amount (total mass) of the second aqueous composition. Moreover, the lower limit of the concentration of the alcohol contained in the second aqueous composition may be, for example, 0.005% by mass, 0.01% by mass, 0.05% by mass, 0.1% by mass, 0.25% by mass, 0.35% by mass, 0.4% by mass, 0.6% by mass, 0.8% by mass, 1.0% by mass, 1.5% by mass, or 1.8% by mass, based on the total amount (total mass) of the second aqueous composition, while the upper limit of the concentration of the alcohol contained in the second aqueous composition may be, for example, 20% by mass, 15% by mass, 10% by mass, 9.0% by mass, 8.0% by mass, 6.0% by mass, 5.5% by mass, 5.0% by mass, 4.5% by mass, 3.0% by mass, 2.8% by mass, etc., based on the total amount (total mass) of the second aqueous composition. The concentration range of the alcohol may be selected as appropriate from the above lower and upper limits combined as appropriate, for example, 0.005% to 20% by mass, 0.01% to 15% by mass, 0.1% to 10% by mass, 0.25% to 9.0% by mass, 0.35% to 8.0% by mass, 0.4% to 6.0% by mass, 0.6% to 5.5% by mass, 0.8% to 4.5% by mass, 0.8% to 3.0% by mass, etc. As a result of selecting the concentration of the alcohol from among these ranges, the effect of the present invention tends to be achieved in a more preferred manner.

4-2-4. Water

The second aqueous composition of the present invention may comprise water, and preferably comprises water. The water intended here is not limited in any way, but it is preferably water which has been treated to remove metal ions, organic impurities, particles and so on by distillation, ion exchange treatment, filter treatment, various adsorption treatments, etc., and it is more preferably pure water, and particularly preferably ultrapure water.

The content of water in the second aqueous composition of the present invention is the balance of the composition (i.e., other than the individual components described above and additives described in detail later), and is not limited in any way, but it is preferably 50% to 99.8% by mass, more preferably 60% to 99% by mass, even more preferably 70% to 97% by mass, and particularly preferably 80% to 95% by mass, based on the total amount (total mass) of the second aqueous composition.

It should be noted that the second aqueous composition of the present invention is preferably in the form of a solution, and is preferably free from components which are non-soluble in the composition in the form of a solution, as exemplified by solid particles such as abrasive particles.

4-2-5. Function and Properties of the Second Aqueous Composition

The second aqueous composition comprising the above individual components is deemed to function as follows during the post-treatment step of the stainless steel surface.

The peroxide or oxidizing agent, and the acid are deemed to react only with deposits derived from copper ions, etc., which were precipitated on the surface of stainless steel, to thereby convert the deposits into water-soluble compounds, and do not affect the roughness of the stainless steel surface or do not affect to greatly change the roughness of the stainless steel surface. Likewise, the alcohol functions as a solvent, whereby products degraded from the deposits will be easily dispersed into the aqueous composition or washing water. Thus, the alcohol is deemed to contribute to the removal of the deposits.

The properties of the second aqueous composition are not limited in any way, but its pH value is less than 7, for example, preferably 0 to 6.5, more preferably 0 to 6, even more preferably 0 to 5, still even more preferably 0 to 4, and particularly preferably 0 to 3. The pH value may be measured by the method described in the Example section.

Moreover, the lower limit of the pH of the second aqueous composition may be, for example, 0.1, 0.2, 0.4, 0.6, 0.8, 1.0 or 1.2, while the upper limit of the pH of the second aqueous composition may be, for example, 6.5, 5.5, 4.5, 3.5, 3.0, 2.8, 2.5, 2.0, etc. The pH range of the second aqueous composition may be selected as appropriate from the above lower and upper limits combined as appropriate.

<4-3. Additives Contained in the Aqueous Compositions>

The first aqueous composition may comprise additives as components other than hydrogen peroxide, copper ions and halide ions mentioned above, as long as the effect of the present invention is exerted. The same goes for the second aqueous composition, and the second aqueous composition may comprise additives other than the peroxide (serving as an oxidizing agent) and the acid.

Examples of these additives include heterocyclic nitrogen compounds (azole compounds), organic solvents and so on. These additives are used either alone or in combination. Moreover, additives also include a surfactant, a pH adjuster and so on, but they are preferably not contained in the aqueous compositions of the present invention.

The concentration of additives which may be contained in each aqueous composition is preferably 10% by mass or less, more preferably 5.0% by mass or less, even more preferably 2.0% by mass or less, and particularly preferably 1.0% by mass or less.

EXAMPLES

The present invention will be further described in more detail by way of the following examples, which are not intended to limit the scope of the invention.

<Evaluation of the Amount of Residual Copper on Alloy (Stainless Steel) Surface>

The surface-treated foils (surface-treated alloy in plate form) obtained by the roughening treatment and post-treatment in the examples and comparative examples were observed with a metal microscope (manufactured by Olympus Corporation, Japan; product name: "MX-63L") to visually evaluate the presence or absence of copper (Cu deposits) on the stainless steel foils (plates) in a field of view at 200-fold magnification. A foil showing no residual copper on its surface was defined as ○ (good), while a foil showing residual copper on its surface was defined as x (poor).

<Measurement of pH Value>

The pH values of the aqueous compositions in the examples and comparative examples were measured at 25° C. with a pH meter (pH meter F-52, manufactured by Horiba, Ltd., Japan).

<Measurement of Surface Roughness of Stainless Steel Foil>

The untreated stainless steel foil used as a starting material, and the surface-treated stainless steel foils obtained in the following examples and comparative examples were measured for their maximum height (Sz) and arithmetical mean height (Sa) according to ISO 25178 with a laser microscope (manufactured by Keyence Corporation, Japan; product name: "VK-X250").

Example 1

A stainless steel (foil) was provided which had a thickness of 40 μm and a length and width of 30 mm×30 mm and whose material was JFE20-5USR (manufactured by JFE Steel Corporation, Japan). The stainless steel (foil) of JFE20-5USR contained 5.5% by mass of aluminum as a metal having an ionization tendency larger than copper. This stainless steel foil, i.e., the untreated stainless steel foil was found to have an Sz of 2.2 μm and an Sa of 0.1 μm, as measured in accordance with the above section "Measurement of surface roughness of stainless steel foil." These values for the surface roughness of the untreated stainless steel foil are shown as the reference example in Table 1 below.

To 118 ml of ultrapure water, hydrogen peroxide in a final amount of 0.3% by mass (1 g of a 60 wt % aqueous hydrogen peroxide solution), 6% by mass (12 g) of copper sulfate pentahydrate, and 35% by mass (69 g) of a 35 wt % aqueous hydrochloric acid solution were added to prepare aqueous composition A1 (corresponding to the first aqueous composition). The concentration of copper ions ($Cu^{2+}$) derived from copper sulfate in this composition A1 was 1.5% by mass based on the total amount of the aqueous composition, while the concentration of halide ions ($Cl^-$) derived from hydrochloric acid was 12% by mass based on the total amount of the aqueous composition.

Likewise, to 171 ml of ultrapure water, hydrogen peroxide in a final amount of 2% by mass (7 g of a 60 wt % aqueous hydrogen peroxide solution), sulfuric acid in a final amount of 4.5% by mass (20 g of a 46 wt % aqueous sulfuric acid solution), and 1% by mass (2 g) of n-propanol were added to prepare aqueous composition B1 (corresponding to the second aqueous composition).

<Step 1: Roughening Treatment Step>

The above stainless steel foil was first soaked for 60 seconds in the above aqueous composition A1 at a solution temperature of 35° C. Then, the soaked stainless steel foil was washed well with ultrapure water to develop a roughened pattern on the surface of the stainless steel foil. The surface of the thus roughened stainless steel foil showed deposits (Cu deposits) which were deemed to be derived from copper ions, etc., in the above aqueous composition A1. Namely, there were confirmed Cu deposits similar to deposits which were not eventually removed in Comparative Examples 1 and 2 described later.

<Step 2: Post-Treatment Step>

Figure 1:
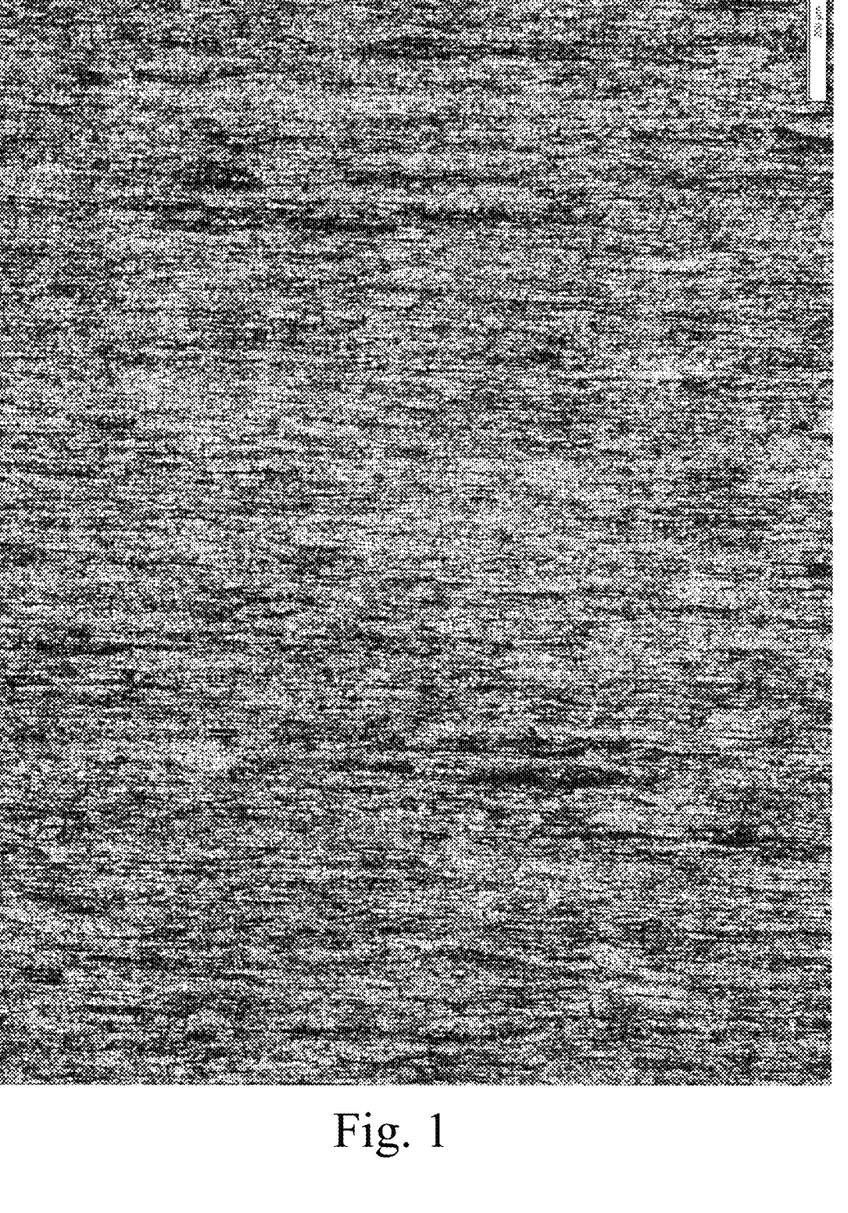
FIG. 1 shows a metal microscope image of the surface of stainless steel after post-treatment in Example 1.

The stainless steel foil roughened in step 1 was soaked for 30 seconds in the above aqueous composition B1 at a solution temperature of 30° C. Then, the soaked stainless steel foil was washed well with ultrapure water, and then dried well to obtain the surface-treated foil. The resulting surface-treated foil was confirmed for the presence or absence of residual Cu deposits on the stainless steel surface after the post-treatment in accordance with the descriptions in the above section "Evaluation of the amount of residual copper on alloy (stainless steel) surface." The surface-treated foil showed no residual Cu deposits in its metal microscope image, and was therefore judged as ○ (good). This metal microscope image is shown in FIG. 1. As can be seen from FIG. 1 which shows the surface having a metallic luster, Cu deposits were confirmed to be removed. Moreover, the surface of the resulting surface-treated foil was measured for its maximum height (Sz) and arithmetical mean height (Sa) in accordance with the above section "Measurement of surface roughness of stainless steel foil," thus indicating that the value of Sz was 13.8 μm, and the value of Sa was 0.6 μm. The results obtained in Example 1 above are shown in Table 1 below.

Example 2

A stainless steel (foil) was provided which had a thickness of 40 μm and a length and width of 30 mm×30 mm and whose material was JFE20-5USR (manufactured by JFE Steel Corporation, Japan). The stainless steel (foil) of JFE20-5USR contained 5.5% by mass of aluminum as a metal having an ionization tendency larger than copper.

To 118 ml of ultrapure water, hydrogen peroxide in a final amount of 0.3% by mass (1 g of a 60 wt % aqueous hydrogen peroxide solution), 6% by mass (12 g) of copper sulfate pentahydrate, and 35% by mass (69 g) of a 35 wt % aqueous hydrochloric acid solution were added to prepare aqueous composition A1 (corresponding to the first aqueous composition). The concentration of copper ions ($Cu^{2+}$) derived from copper sulfate in this composition A1 was 1.5% by mass based on the total amount of the aqueous composition, while the concentration of halide ions ($Cl^-$) derived from hydrochloric acid was 12% by mass based on the total amount of the aqueous composition.

Likewise, to 173 ml of ultrapure water, hydrogen peroxide in a final amount of 2% by mass (7 g of a 60 wt % aqueous hydrogen peroxide solution), and sulfuric acid in a final amount of 4.5% by mass (20 g of a 46 wt % aqueous sulfuric acid solution) were added to prepare aqueous composition B2 (corresponding to the second aqueous composition).

<Step 1: Roughening Treatment Step>

The above stainless steel foil was first soaked for 60 seconds in the above aqueous composition A1 at a solution temperature of 35° C. Then, the soaked stainless steel foil was washed well with ultrapure water to develop a roughened pattern on the surface of the stainless steel foil. The surface of the thus roughened stainless steel foil showed deposits (Cu deposits).

<Step 2: Post-Treatment Step>

The stainless steel foil roughened in step 1 was soaked for 30 seconds in the above aqueous composition B2 at a solution temperature of 30° C. Then, the soaked stainless steel foil was washed well with ultrapure water, and then dried well to obtain the surface-treated foil. The resulting surface-treated foil was confirmed for the presence or absence of residual Cu deposits on the stainless steel surface after the post-treatment in accordance with the descriptions in the above section "Evaluation of the amount of residual copper on alloy (stainless steel) surface." The surface-treated foil showed no residual Cu deposits in its metal microscope image, and was therefore judged as ◯ (good). Moreover, the surface of the resulting surface-treated foil was measured for its maximum height (Sz) and arithmetical mean height (Sa) in accordance with the above section "Measurement of surface roughness of stainless steel foil," thus indicating that the value of Sz was 13.5 μm, and the value of Sa was 0.6 μm. These results are shown in Table 1 below.

Example 3

A stainless steel (foil) was provided which had a thickness of 40 μm and a length and width of 30 mm×30 mm and whose material was JFE20-5USR (manufactured by JFE Steel Corporation, Japan). The stainless steel (foil) of JFE20-5USR contained 5.5% by mass of aluminum as a metal having an ionization tendency larger than copper.

To 118 ml of ultrapure water, hydrogen peroxide in a final amount of 0.3% by mass (1 g of a 60 wt % aqueous hydrogen peroxide solution), 6% by mass (12 g) of copper sulfate pentahydrate, and 35% by mass (69 g) of a 35 wt % aqueous hydrochloric acid solution were added to prepare aqueous composition A1 (corresponding to the first aqueous composition). The concentration of copper ions ($Cu^{2+}$) derived from copper sulfate in this composition A1 was 1.5% by mass based on the total amount of the aqueous composition, while the concentration of halide ions ($Cl^-$) derived from hydrochloric acid was 12% by mass based on the total amount of the aqueous composition.

Likewise, to 180 ml of ultrapure water, sodium persulfate in a final amount of 9.0% by mass (18 g), and 1% by mass (2 g) of n-propanol were added to prepare aqueous composition B3 (corresponding to the second aqueous composition).

<Step 1: Roughening Treatment Step>

The above stainless steel foil was first soaked for 60 seconds in the above aqueous composition A1 at a solution temperature of 35° C. Then, the soaked stainless steel foil was washed well with ultrapure water to develop a roughened pattern on the surface of the stainless steel foil. The surface of the thus roughened stainless steel foil showed deposits (Cu deposits).

<Step 2: Post-Treatment Step>

The stainless steel foil roughened in step 1 was soaked for 30 seconds in the above aqueous composition B3 at a solution temperature of 30° C. Then, the soaked stainless steel foil was washed well with ultrapure water, and then dried well to obtain the surface-treated foil. The resulting surface-treated foil was confirmed for the presence or absence of residual Cu deposits on the stainless steel surface after the post-treatment in accordance with the descriptions in the above section "Evaluation of the amount of residual copper on alloy (stainless steel) surface." The surface-treated foil showed no residual Cu deposits in its metal microscope image, and was therefore judged as ◯ (good). Moreover, the surface of the resulting surface-treated foil was measured for its maximum height (Sz) and arithmetical mean height (Sa) in accordance with the above section "Measurement of surface roughness of stainless steel foil," thus indicating that the value of Sz was 13.0 μm, and the value of Sa was 0.6 μm. These results are shown in Table 1 below.

Examples 4 to 8

In Examples 4 to 8, the roughening treatment step and the post-treatment step were conducted in the same manner as shown in Example 1, except for using aqueous compositions different from those of Example 1. The components and their amounts of the aqueous compositions used in step 1 (the roughening treatment step) and step 2 (the post-treatment step) in Examples 4 to 8 and the results of each treatment are shown in Table 1 below.

Comparative Example 1

A stainless steel (foil) was provided which had a thickness of 40 μm and a length and width of 30 mm×30 mm and whose material was JFE20-5USR (manufactured by JFE Steel Corporation, Japan). The stainless steel (foil) of JFE20-5USR contained 5.5% by mass of aluminum as a metal having an ionization tendency larger than copper.

To 118 ml of ultrapure water, hydrogen peroxide in a final amount of 0.3% by mass (1 g of a 60 wt % aqueous hydrogen peroxide solution), 6% by mass (12 g) of copper sulfate pentahydrate, and 35% by mass (69 g) of a 35 wt % aqueous hydrochloric acid solution were added to prepare aqueous composition A1. The concentration of copper ions ($Cu^{2+}$) derived from copper sulfate in this composition A1 was 1.5% by mass based on the total amount of the aqueous composition, while the concentration of halide ions ($Cl^-$) derived from hydrochloric acid was 12% by mass based on the total amount of the aqueous composition.

Likewise, to 178 ml of ultrapure water, 4.5% by mass of sulfuric acid (20 g of a 46 wt % aqueous sulfuric acid solution), and 1% by mass (2 g) of n-propanol were added to prepare aqueous composition B4.

<Step 1: Roughening Treatment Step>

The above stainless steel foil was first soaked for 60 seconds in the above aqueous composition A1 at a solution temperature of 35° C. Then, the soaked stainless steel foil was washed well with ultrapure water to develop a roughened pattern on the surface of the stainless steel foil.

<Step 2: Post-Treatment Step>

Figure 2:
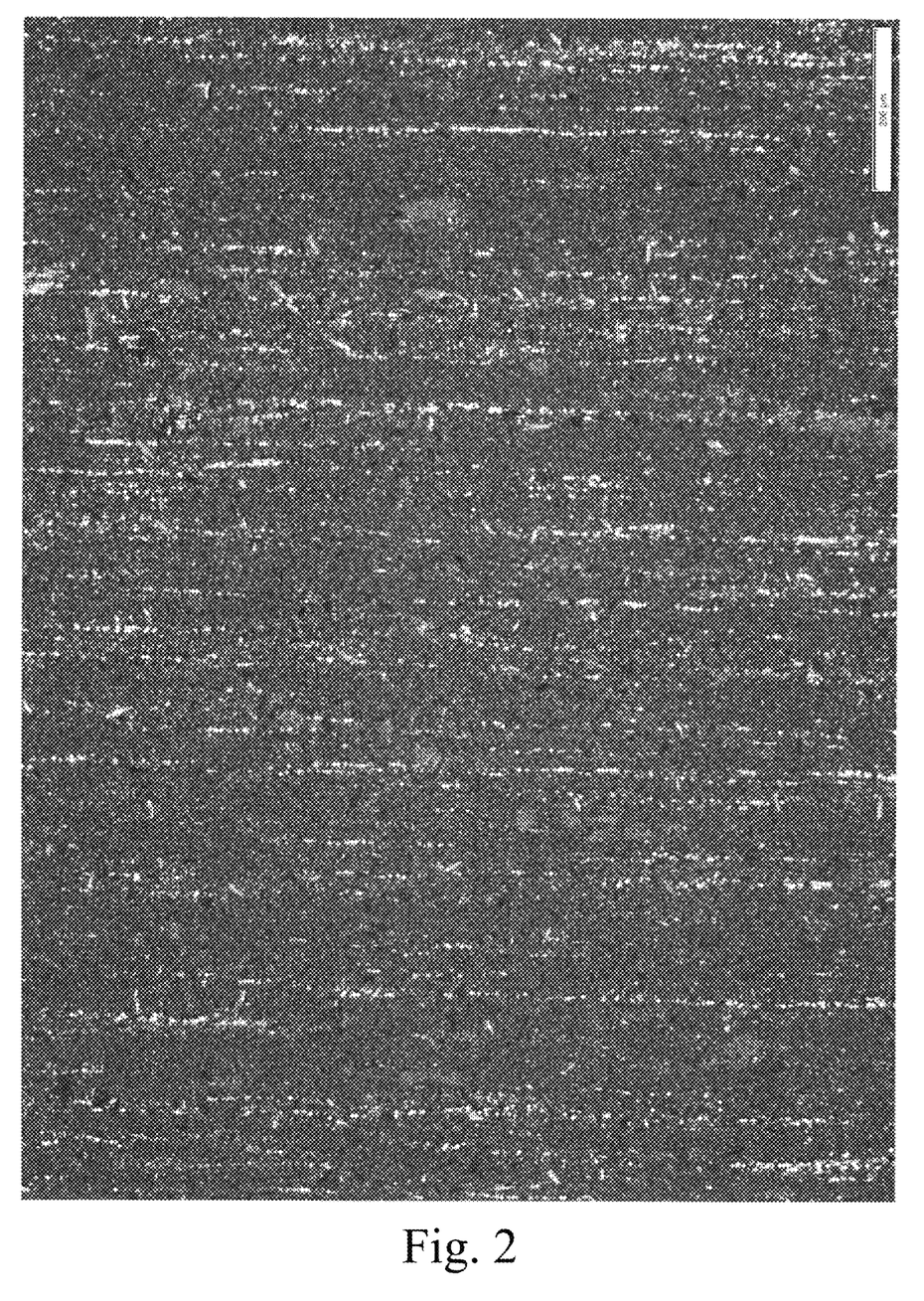
FIG. 2 shows a metal microscope image of the surface of stainless steel after post-treatment in Comparative Example 1.

The stainless steel foil roughened in step 1 was soaked for 30 seconds in the above aqueous composition B4 at a solution temperature of 30° C. Then, the soaked stainless steel foil was washed well with ultrapure water, and then dried well to obtain the surface-treated foil. The resulting surface-treated foil was confirmed for the presence or absence of residual Cu deposits on the stainless steel surface after the post-treatment in accordance with the descriptions in the above section "Evaluation of the amount of residual copper on alloy (stainless steel) surface." The surface-treated foil showed residual Cu deposits almost all over the surface in its metal microscope image, and was therefore judged as x (poor). This metal microscope image is shown in FIG. 2. In FIG. 2, regions of copper-derived deposits, which appear reddish in the color image, are shown as darker regions than in FIG. 1, although they are not always easy to distinguish in the monochrome image, so that dark regions were observed as a whole. On the other hand, in FIG. 2, whitish bright regions derived from the metallic luster shown in FIG. 1 were confirmed only in a very few regions. Due to residual copper on the treated surface, the surface roughness could not be accurately measured, and the above "Measurement of surface roughness of stainless steel foil" was therefore not conducted.

Comparative Example 2

A stainless steel (foil) was provided which had a thickness of 40 μm and a length and width of 30 mm×30 mm and whose material was JFE20-5USR (manufactured by FE Steel Corporation, Japan). The stainless steel (foil) of JFE20-5USR contained 5.5% by mass of aluminum as a metal having an ionization tendency larger than copper.

To 118 ml of ultrapure water, hydrogen peroxide in a final amount of 0.3% by mass (1 g of a 60 wt % aqueous hydrogen peroxide solution), 6% by mass (12.0 g) of copper sulfate pentahydrate, and 35% by mass (69 g) of a 35 wt % aqueous hydrochloric acid solution were added to prepare aqueous composition A1. The concentration of copper ions ($Cu^{2+}$) derived from copper sulfate in this composition A1 was 1.5% by mass based on the total amount of the aqueous composition, while the concentration of halide ions ($Cl^-$) derived from hydrochloric acid was 12% by mass based on the total amount of the aqueous composition.

Likewise, to 191 ml of ultrapure water, hydrogen peroxide in a final amount of 2% by mass (7 g of a 60 wt % aqueous hydrogen peroxide solution), and 1% by mass (2 g) of n-propanol were added to prepare aqueous composition B5.

<Step 1: Roughening Treatment Step>

The above stainless steel foil was first soaked for 60 seconds in the above aqueous composition A1 at a solution temperature of 35° C. Then, the soaked stainless steel foil was washed well with ultrapure water to develop a roughened pattern on the surface of the stainless steel foil.

<Step 2: Post-Treatment Step>

Figure 3:
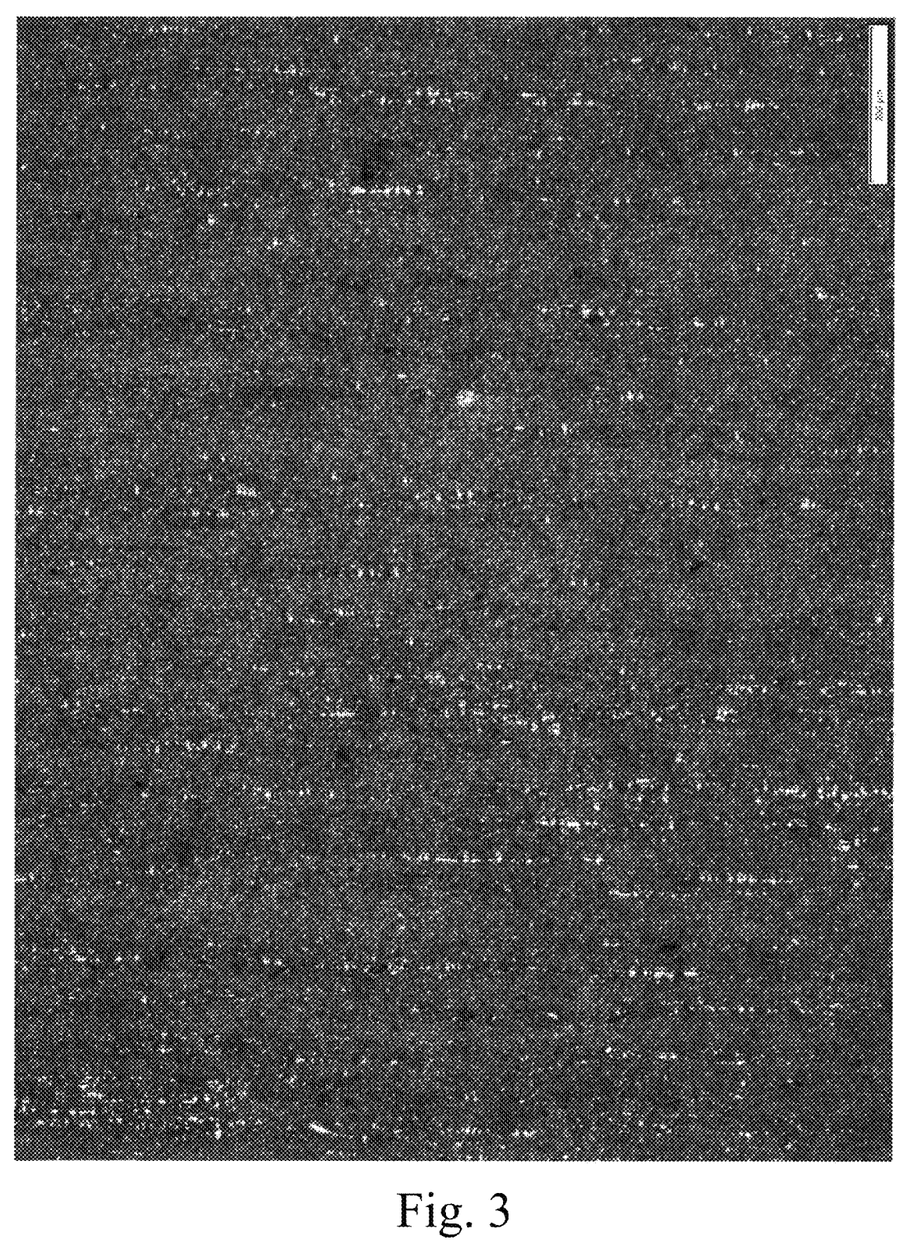
FIG. 3 shows a metal microscope image of the surface of stainless steel after post-treatment in Comparative Example 2.

The stainless steel foil roughened in step 1 was soaked for 30 seconds in the above aqueous composition B5 at a solution temperature of 30° C. Then, the soaked stainless steel foil was washed well with ultrapure water, and then dried well to obtain the surface-treated foil. The resulting surface-treated foil was confirmed for the presence or absence of residual Cu deposits on the stainless steel surface after the post-treatment in accordance with the descriptions in the above section "Evaluation of the amount of residual copper on alloy (stainless steel) surface." The surface-treated foil showed residual Cu deposits almost all over the surface in its metal microscope image, and was therefore judged as x (poor). This metal microscope image is shown in FIG. 3. In FIG. 3, regions of deposits appearing reddish in the color image and dark in the monochrome image were confirmed to cover most of the surface of the stainless steel foil, as in the case of FIG. 2. Due to residual copper on the treated surface, the surface roughness could not be accurately measured, and the above "Measurement of surface roughness of stainless steel foil" was therefore not conducted.

Comparative Example 3

In Example 3, step 1 (the roughening treatment step) was conducted using an aqueous composition different from that of Comparative Example 1, followed by step 2 (the post-treatment step). The components and their amounts of the aqueous composition used in each step of Comparative Example 3 and the results of each treatment are shown in Table 1 below.

TABLE 1

| | | Step 1 Aqueous composition A | | | Step 2 | | | | | | Evaluation of | | |
|---|---|---|---|---|---|---|---|---|---|---|---|---|---|
| | | | | | | | Aqueous composition B | | | | | | |
| | Type of stainless steel | Hydrogen peroxide/ wt % | Copper ion/ wt % | Chloride ion/ wt % | Hydrogen peroxide/ wt % | Persulfuric acid/ wt % | Acid Type | Conc./ wt % | Alcohol Type | Conc./ wt % | Solution pH | residual copper deposits | Sa/ μm | Sz/ μm |
| Example 1 | JFE20-5USR (Al 5.5%) | 0.3 | 1.5 | 12 | 2.0 | — | Sulfuric acid | 4.5 | n-Propanol | 1.0 | 0.8 | ○ | 0.6 | 13.8 |
| Example 2 | JFE20-5USR (Al 5.5%) | 0.3 | 1.5 | 12 | 2.0 | — | Sulfuric acid | 4.5 | — | — | 1.0 | ○ | 0.6 | 13.5 |
| Example 3 | JFE20-5USR (Al 5.5%) | 0.3 | 1.5 | 12 | — | Sodium persulfate 9.0 | — | — | n-Propanol | 1.0 | 2.8 | ○ | 0.6 | 13.0 |
| Example 4 | JFE20-5USR (Al 5.5%) | 0.1 | 0.25 | 20 | 2.0 | — | Sulfuric acid | 4.5 | n-Propanol | 1.0 | 0.8 | ○ | 0.6 | 5.5 |
| Example 5 | JFE20-5USR (Al 5.5%) | 0.3 | 1.5 | 12 | 15.0 | — | Sulfuric acid | 1.0 | n-Propanol | 5.0 | 1.2 | ○ | 0.5 | 7.5 |
| Example 6 | JFE20-5USR (Al 5.5%) | 0.3 | 1.5 | 12 | 1.0 | — | Sulfuric acid | 15 | n-Propanol | 5.0 | 0.7 | ○ | 0.7 | 7.0 |
| Example 7 | JFE20-5USR (Al 5.5%) | 10 | 3.0 | 10 | 2.0 | — | Sulfuric acid | 4.5 | n-Propanol | 1.0 | 0.8 | ○ | 1.0 | 12.5 |
| Example 8 | JFE20-5USR (Al 5.5%) | 15 | 0.5 | 5.0 | 2.0 | — | Sulfuric acid | 4.5 | n-Propanol | 1.0 | 0.8 | ○ | 0.7 | 5.7 |
| Comparative Example 1 | JFE20-5USR (Al 5.5%) | 0.3 | 1.5 | 12 | — | — | Sulfuric acid | 4.5 | n-Propanol | 1.0 | 0.6 | x | — | — |
| Comparative Example 2 | JFE20-5USR (Al 5.5%) | 0.3 | 1.5 | 12 | — | — | — | — | n-Propanol | 1.0 | 2.1 | x | — | — |
| Comparative Example 3 | JFE20-5USR (Al 5.5%) | 0.3 | 1.5 | — | 2.0 | — | Sulfuric acid | 4.5 | n-Propanol | 1.0 | 0.8 | ○ | 0.2 | 1.9 |
| Reference Example (untreated) | JFE20-5USR (Al 5.5%) | — | — | — | — | — | — | — | — | — | — | — | 0.1 | 2.2 |

INDUSTRIAL APPLICABILITY

According to the present invention, when using an aqueous composition of particular composition, the surface of stainless steel can be sufficiently roughened in an efficient manner with few steps and in a short time, and the surface quality of stainless steel can also be maintained in a good state. Moreover, when stainless steel whose surface has been thus roughened while maintaining a good appearance is used in battery current collector foils, automotive component housings, etc., dielectric substances or organic materials can be effectively adhered or held. Also in the case of members for heat radiation, stainless steel with a roughened surface may preferably be used.

Accordingly, the present invention has industrial applicability in the field of surface roughening treatment of stainless steel for use in material members, e.g., the above products.

The invention claimed is:

1. A roughening treatment method for roughening a surface of stainless steel, the method comprising:
   roughening the surface of the stainless steel that contains copper or a metal having an ionization tendency larger than copper by contacting a first aqueous composition with the surface of the stainless steel in a roughening treatment, and
   performing a post-treatment by contacting, under an acidic condition, a second aqueous composition comprising a peroxide with the surface of the stainless steel that has been roughened in the roughening treatment,
   wherein the first aqueous composition comprises, based on a total amount of the first aqueous composition:
   0.1% to 20% by mass of hydrogen peroxide;
   0.25% to 40% by mass of copper ions; and
   1% to 30% by mass of halide ions.

2. The roughening treatment method according to claim 1, wherein the post-treatment comprises etching deposits on the surface of the stainless steel that has been roughened in the roughening treatment.

3. The roughening treatment method according to claim 2, wherein the deposits are derived from copper or the metal having an ionization tendency larger than copper contained in the stainless steel subjected to the roughening treatment and the copper ions contained in the first aqueous composition.

4. The roughening treatment method according to claim 1, wherein the second aqueous composition comprises 0.2% to 20% by mass of the peroxide based on a total amount of the second aqueous composition.

5. The roughening treatment method according to claim 1, wherein the peroxide contained in the second aqueous composition comprises one or more selected from the group consisting of hydrogen peroxide, persulfuric acid and a salt thereof.

6. The roughening treatment method according to claim 1, wherein the second aqueous composition further comprises 0.5% to 15% by mass of an acid based on a total amount of the second aqueous composition.

7. The roughening treatment method according to claim 6, wherein the acid contained in the second aqueous composition comprises one or more selected from the group consisting of sulfuric acid and sodium hydrogen sulfate.

8. The roughening treatment method according to claim 1, wherein the second aqueous composition further comprises 0.1% to 5% by mass of an alcohol based on a total amount of the second aqueous composition.

9. The roughening treatment method according to claim 8, wherein the alcohol is an alcohol containing 1 to 3 carbon atoms.

10. The roughening treatment method according to claim 1, wherein the stainless steel subjected to the roughening treatment contains copper or at least aluminum as the metal having an ionization tendency larger than copper.

11. The roughening treatment method according to claim 1, wherein the stainless steel subjected to the roughening treatment contains 5% by mass or more of copper or the metal having an ionization tendency larger than copper.

12. The roughening treatment method according to claim 1, wherein the first aqueous composition comprises at least one of copper sulfate and copper chloride as a compound supplying the copper ions.

13. The roughening treatment method according to claim 1, wherein the first aqueous composition comprises one or more selected from the group consisting of hydrochloric acid, sodium chloride and copper chloride as a compound supplying the halide ions.

14. The roughening treatment method according to claim 1, wherein the post-treatment is performed at a temperature of 20° C. to 60° C.

15. The roughening treatment method according to claim 1, wherein the post-treatment is performed for a time period of 10 seconds to 120 seconds.

16. The roughening treatment method according to claim 1, wherein the surface of the stainless steel has a maximum height (Sz) as defined in ISO 25178 of 10.0 µm or more both after the roughening treatment and after the post-treatment.

17. The roughening treatment method according to claim 1, wherein the surface of the stainless steel has an arithmetical mean height (Sa) as defined in ISO 25178 of 0.4 µm or more both after the roughening treatment and after the post-treatment.

18. A method for manufacturing roughened stainless steel, the method comprising:
   preparing the roughened stainless steel by performing the roughening treatment method according to claim 1.

* * * * *